United States Patent [19]
Beasley

[11] Patent Number: 5,936,626
[45] Date of Patent: Aug. 10, 1999

[54] COMPUTER GRAPHICS SILHOUETTE LOAD MANAGEMENT

[75] Inventor: Graham Beasley, Sunnyvale, Calif.

[73] Assignee: Silicon Graphics, Inc., Mountain View, Calif.

[21] Appl. No.: 08/598,154

[22] Filed: Feb. 7, 1996

[51] Int. Cl.⁶ .................................................. G06F 15/00
[52] U.S. Cl. ........................................................... 345/357
[58] Field of Search ..................... 395/133, 135; 345/357, 356, 355, 433, 435, 423, 427

[56] References Cited

U.S. PATENT DOCUMENTS 5,519,826  5/1996  Harper et al. ............................ 395/152
5,621,869  4/1997  Drews ...................................... 395/135

*Primary Examiner*—Phu K. Nguyen
*Attorney, Agent, or Firm*—Wagner Murabito & Hao

[57] ABSTRACT

A method of displaying an object in a real-time simulation using silhouette load mangement techniques, whereby a minimal number of polygons is used in the display process. Two-dimensional silhouettes are created by taking snapshots of three-dimensional models at various angles of view. These silhouettes are stored in texture memory. The appropriate silhouette is selected for display depending upon the angle from which that object is viewed. As the angle of view changes, a different silhouette is selected for display. Once a threshold, such as the angle of rotation or the distance from the viewer, has been reached, the three-dimensional model is substituted for the silhouette for display.

17 Claims, 7 Drawing Sheets

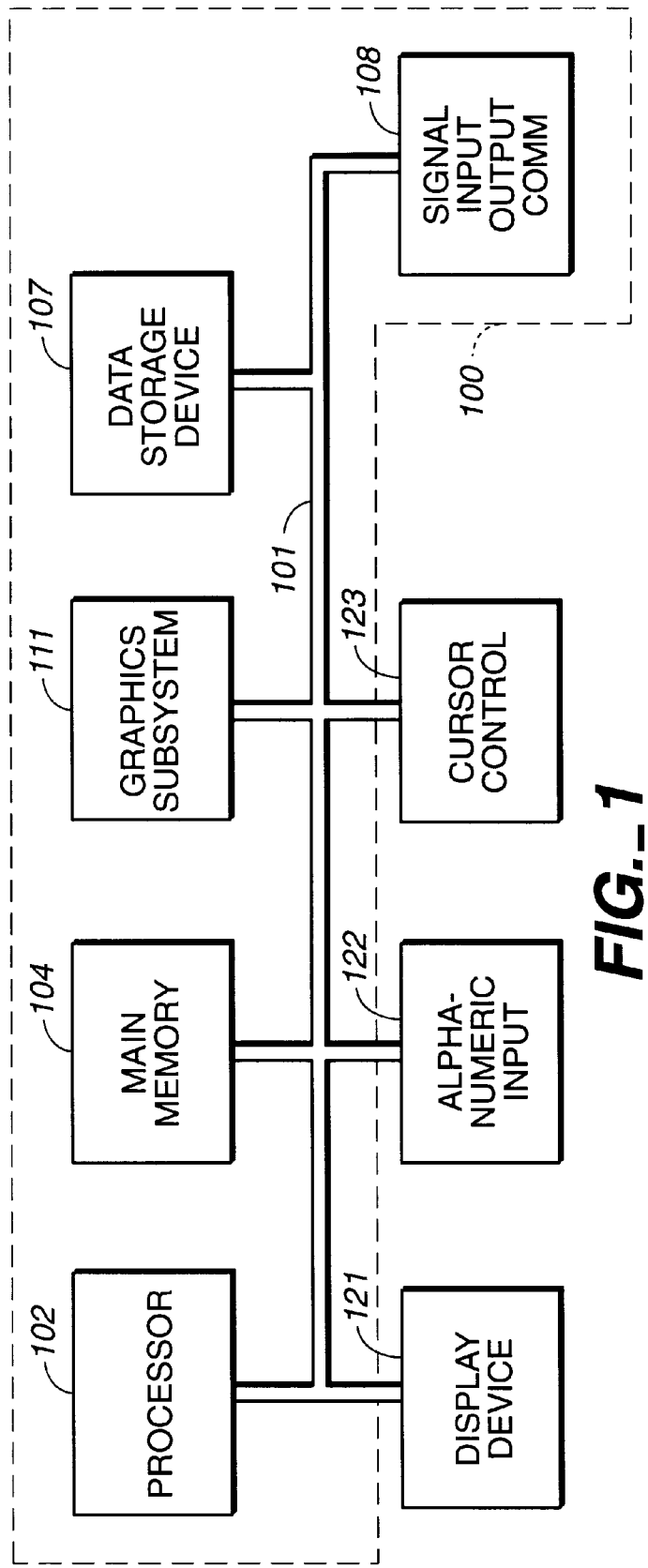
FIG._1

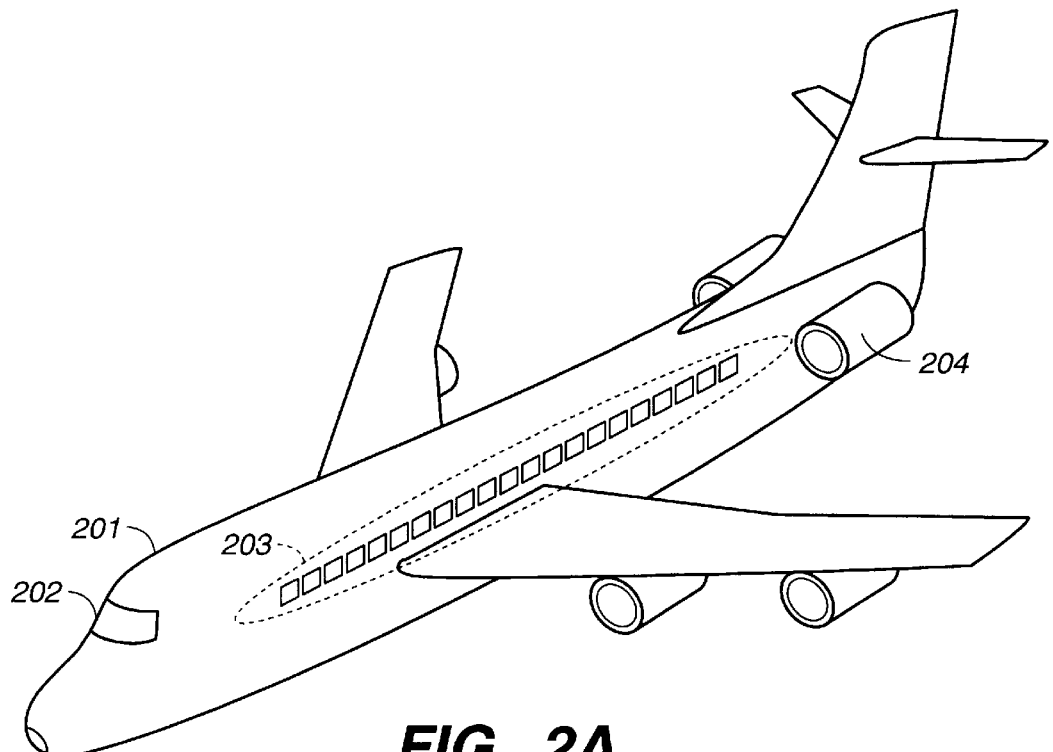
FIG._2A
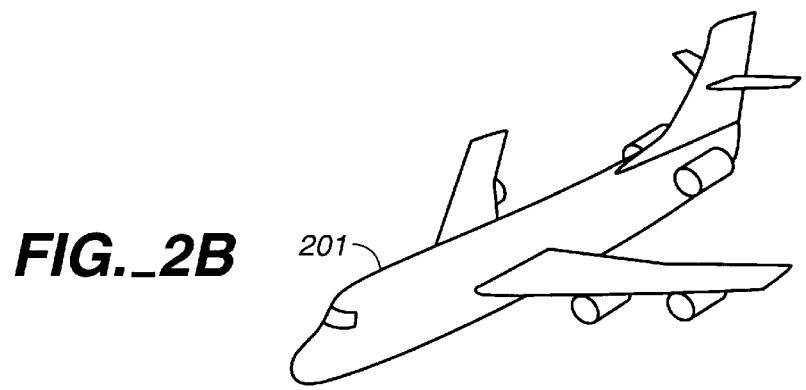
FIG._2B
FIG._2C

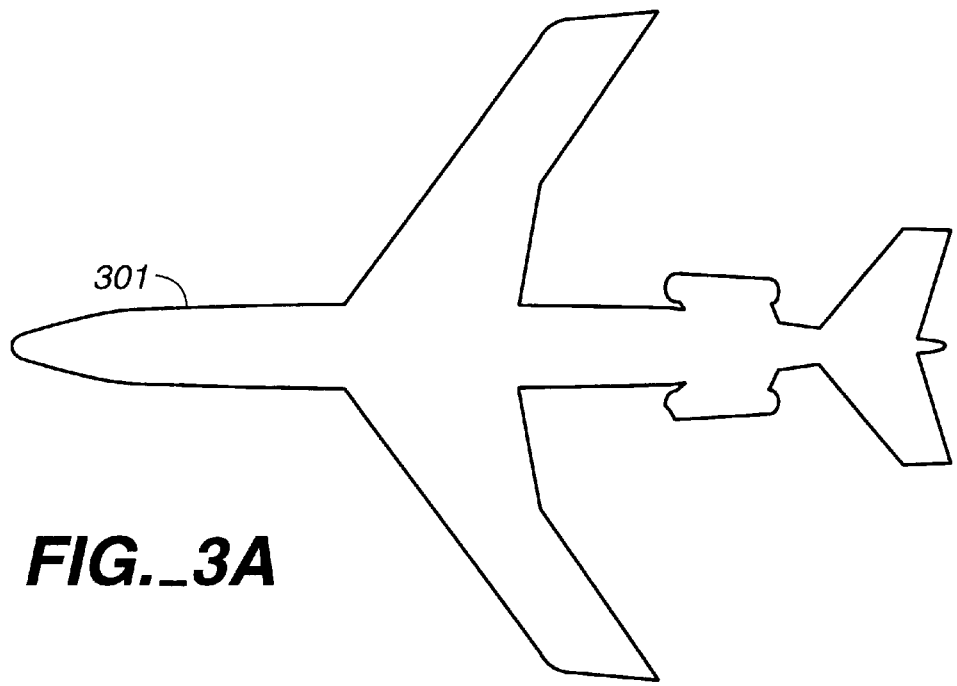
FIG._3A
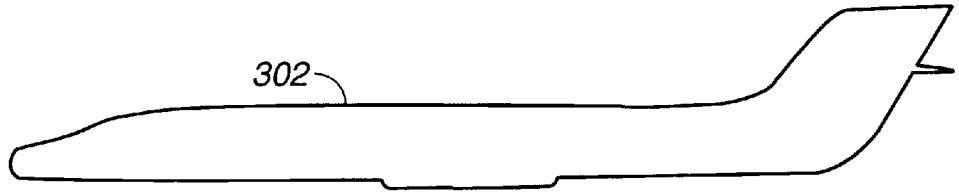
FIG._3B
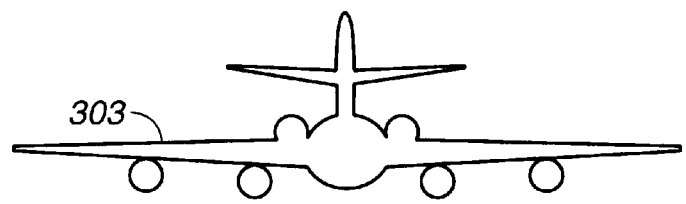
FIG._3C

FIG._4A
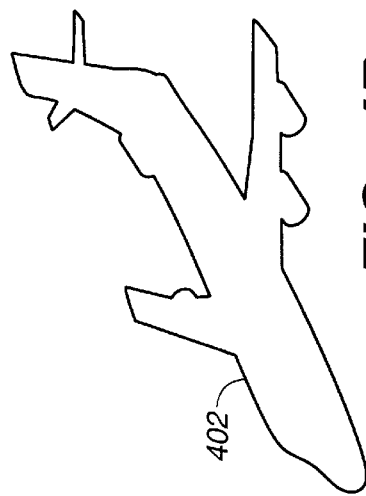
FIG._4B
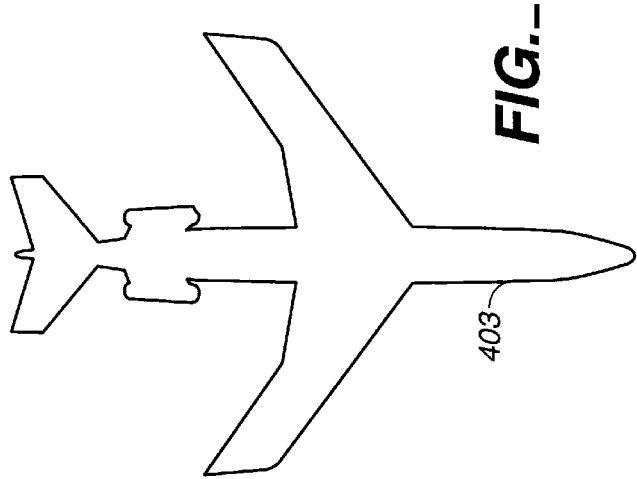
FIG._4C

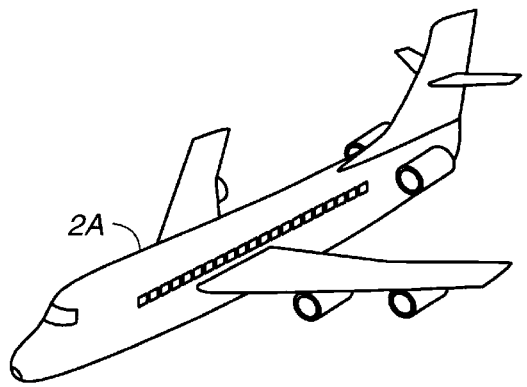
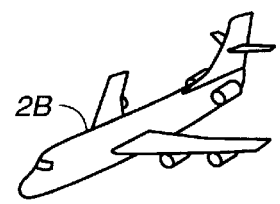
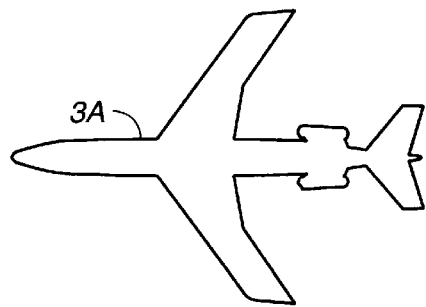
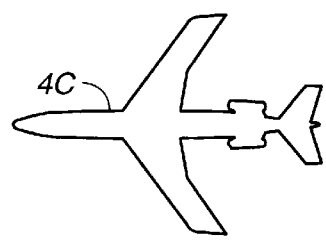
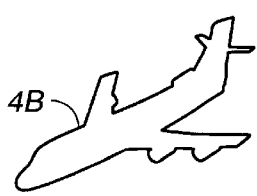
FIG._5

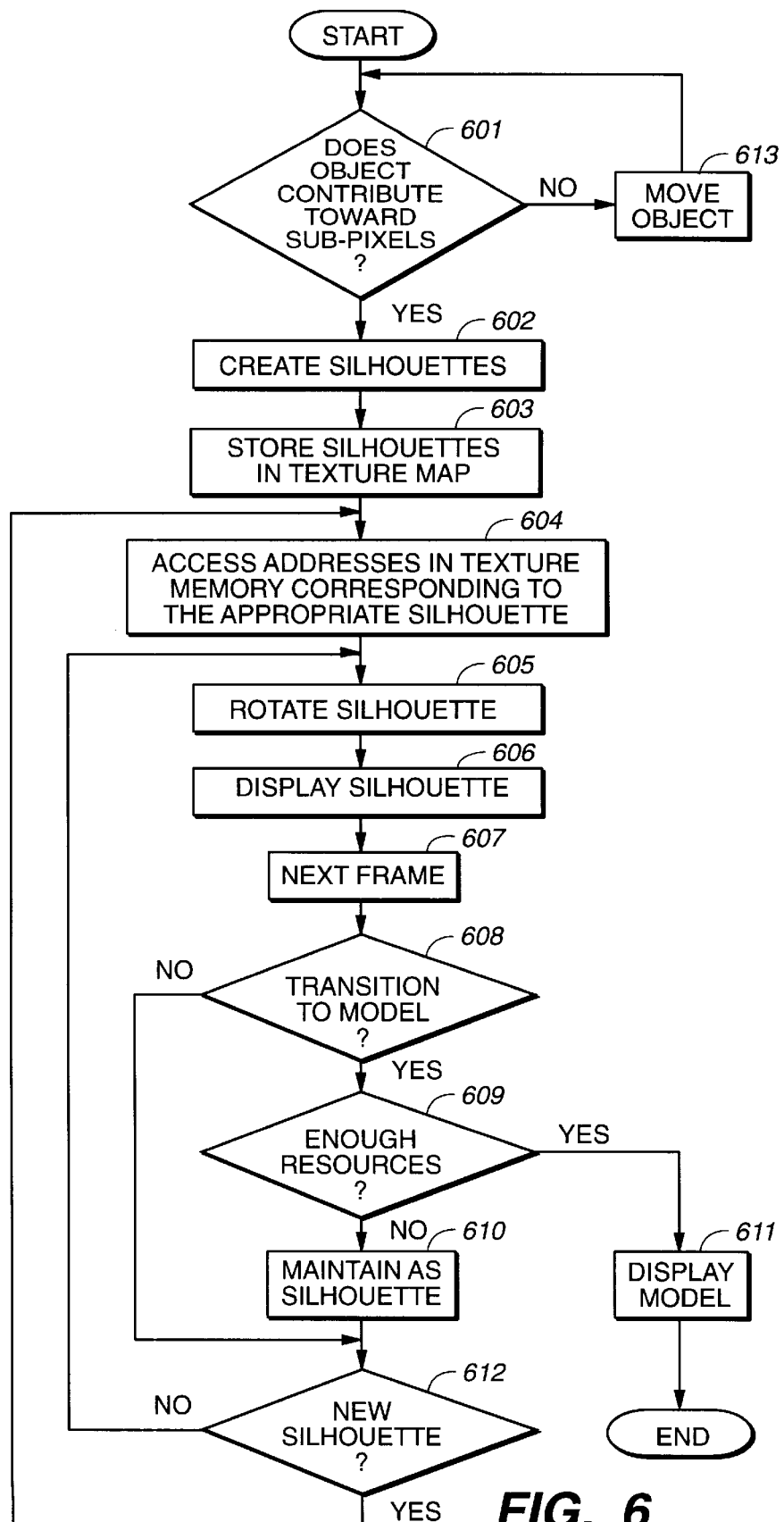
FIG._6

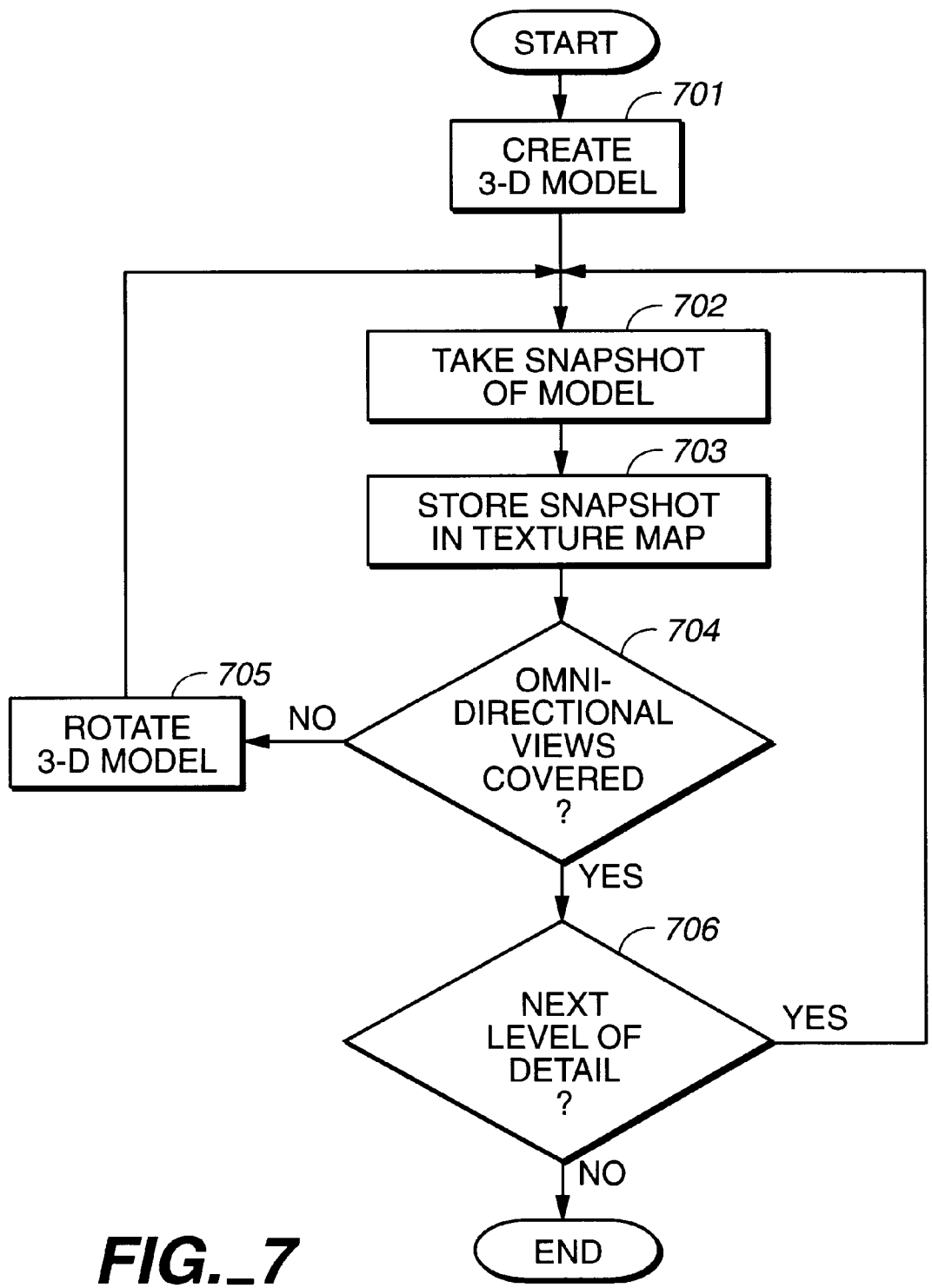
FIG._7

COMPUTER GRAPHICS SILHOUETTE LOAD MANAGEMENT

FIELD OF THE INVENTION

The present invention pertains to silhouette load management in a computer graphics system.

BACKGROUND OF THE INVENTION

Today, computer graphics is used in a wide variety of applications, such as in business, science, animation, simulation, computer-aided design, process control, electronic publication, etc. In an effort to portray a more realistic real-world representation, three dimensional objects are transformed into models having the illusion of depth for display onto a two-dimensional computer screen. This is accomplised by using a number of polygons to represent a three-dimensional object. Complex three-dimensional objects may require upwards of hundreds of polygons in order to form an accurate model. Hence, a three-dimensional object can be readily manipulted (e.g., displayed in a different location, rotated, scaled, etc.) by processing the individual respective polygons corresponding to that object. Next, a scan conversion process is used to determine which pixels of a computer display fall within each of the specified polygons. Thereupon, texture is applied to only those pixels residing within specified polygons. In addition, hidden or obsured surfaces, which are normally not visible, are eliminated from view. Hence, displaying a three-dimensional object on a computer system is a rather complicated task and can require a tremendous amount of processing power.

This is especially true for those cases involving dynamic computer graphics for displaying three-dimensional objects that are in motion. In order to simulate smooth motion, the computer system should have a frame rate of at least 30 hertz. In other words, new images should be updated, redrawn and displayed at least thirty times a second. This imposes a heavy processing and computational burden on the computer system. Indeed, even more processing power is required for interactive computer graphics, where displayed images change in response to a user input. A good example of interactive computer graphics is that of a flight simulator. The terrain changes, depending upon where the user directs the aircraft to fly. An interactive simulation becomes more realistic and useful when a number of moving objects are introduced. For instance, a flight simulator for training jet fighter pilots should optimally display other friendly and enemy aircraft, helicopters, tanks, trucks, trains, ships, as well as other objects that one could reasonably expect to encounter in a battlefield situation. A pilot's training and experience are enhanced by simulating a stressful environment where a lot of action with numerous different objects are occurring.

However, each extra object (e.g., an enemy helicopter) that is added into a scene needs to be modeled, scan converted, textured, Z-buffered for depth, etc., all of which, adds to the amount of processing resources that is required. In addition, it would be highly preferable if lighting, shadowing, shading, and different weather conditions could be included as part of the interactive simulation. Providing these special effects, again, consumes valuable processing resources. Hence, a major problem associated with producing realistic interactive three-dimensional simulations is that it requires such a tremendous amount of processing power. The "richer" and more realistic a scene becomes, the more processing power that is required to render that scene. Moreover, speed becomes a major limiting factor as the computer must render millions of pixels in order to process these amazingly complex scenes every three-tenths of a second.

In an effort to minimize the processing burden, some prior art computer graphics systems have culled out extraneous details so that they need not be rendered for display. One method for accomplishing this is to reduce the number of polygons used to model an object. For instance, rather than using 500 polygons to model an object, the object is modeled with just 200 polygons. However, the disadvantage to this approach is that it results in an inferior picture quality. Reducing the number of polygons makes that object coarser in appearance. As a result, quality is sacrificed at the expense of conserving processing resources.

Another prior art approach for minimizing the requisite processing involves the use of "billboards." Basically, billboards are two-dimensional representations; they lack depth. By analogy, billboards are similar to props or fronts used in movie sets. Instead of modeling a complex object three-dimensionally, it is billboarded. For instance, trees are commonly displayed by the use of billboards because they are so difficult to model in 3-D. The billboard of a tree rotates in sync with a user's viewpoint so that it's almost constantly facing the user. However, one disadvantage with using billboards is that they are typically limited to representing only static objects (e.g., trees, mountains, buildings, etc.). Another disadvantage is that a billboard looks awkward when viewed at extreme angles. For example, one can never see the top of a billboarded tree. Likewise, if one attempts to walk around a billboarded tree, the tree would become narrower and narrower until it eventually becomes a straight line and then disappears.

Yet another prior art method for reducing processing requirements is to use different levels of detail. This prior art concept is based on the fact that human perception discerns greater amounts of detail when an object is closer to the user. As the object gets further away from the viewer it becomes smaller, and hence, less distinct and blurred. Consequently, the display characteristics of an object are pre-computed at different levels of detail and stored into memory. When viewed at close range, a high level of detail is used to display the object. Conversely, when the object is far away, a low level of detail is rendered for display. For example, a house might be rendered with a porch, a chimney, and window shutters at a high level of detail. In a lower level of detail, the house is smaller, and the shutters might not be shown. The chimney might be eliminated in the next lower level of detail. One problem with this prior art approach is that when the computer system transitions between two levels of detail, the differences between the two levels tend to "pop" in and out of display. For example, as one gets closer to the house, the chimney might all of a sudden pop into view. Furthermore, as one transistions back and forth across the threshold between these two different levels of detail, it could result in a blinking or flashing anomaly. Since the human eye tends to cue in on movement, a flashing anomaly attracts attention and can be extremely disconcerting and annoying. For example, a blinking chimney ruins the realism of that visual simulation.

Yet another problem associated with real-time three-dimensional interactive simulations pertains to load management. A computer system has a fixed and limited processing capability, for example, the capability to process 40,000 polygons. It is desirable to run the computer system at its peak performance in order to render the most realistic images. It is also desirable to maintain this processing load at a consistent level for smooth, clean displays. However, these two goals are difficult to achieve because the scene is constantly changining and objects are constantly moving into and out of view. For instance, one scene might only depict a solitary car, whereas a subsequent scene might have twenty cars (e.g., rush hour traffic). The subsequent scene would thereby require additional processing resources over the first scene. There could be serious problems if all of the processing power had already been consumed in rendering the first scene.

Therefore, there is a need in the prior art for an apparatus and method that could somehow display full, robust, and realistic interactive three-dimensional graphics on a computer system while minimizing the required processing. It would be preferable if such an apparatus and method could somehow minimize anomalies associated during transisfions between levels of detail and also aid in maintaining a consistent load.

SUMMARY OF THE INVENTION

The present invention pertains to an apparatus and method for displaying objects in a real-time computer display with the use of textured silhouettes in order to minimize the number of requisite polygons. Initially, a three-dimensional model comprised of a number of polygons is generated according to traditional approaches. Next, two-dimensional silhouettes are created by taking snapshots of three-dimensional models at various angles of view. These silhouettes have a lesser number of polygons than their three-dimensional model counterparts. Consequently, the silhouettes can be rendered faster and with less processing power than their three-dimensional model counterparts. The silhouettes are stored in texture memory. The appropriate silhouette is selected for display, depending upon the angle from which that object is viewed. As the angle of view changes, a different silhouette is selected for display. Hence, the present invention minimizes the need to process a great number of polygons, and yet, retains the degree of detail for achieving a high level of realism. Once a threshold, such as the angle of rotation or the distance from the viewer, has been reached, the three-dimensional model is substituted in place of the silhouette for display.

In alternative embodiments, the present invention can aid in minimizing any anomalies when transitioning between two different levels of detail by rendering a coarse silhouette based upon a model from a higher level of detail. Furthermore, new silhouettes can be derived from adjacent silhouettes or models via interpolation. In addition, the load upon the computer system can be regulated by switching between two-dimensional silhouettes and three-dimensional models.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows a computer graphics system upon which the present invention may be practiced.

FIGS. 2A, 2B, and 2C show a three-dimensional models of an airplane in high, medium, and low levels of detail, respectively.

FIGS. 3A, 3B, and 3C show various silhouettes of an airplane.

FIGS. 4A, 4B, and 4C show three different silhouettes that may be used to display a sequence of motion of an airplane as it descends in a flight plan towards the viewer.

FIG. 5 shows the different views of airplane that can be stored as a composite texture.

FIG. 6 is a flowchart describing the steps for displaying textured silhouettes in a computer graphics system.

FIG. 7 is a flowchart describing the steps for generating silhouettes.

DETAILED DESCRIPTION

A computer system having advanced silhouette load management is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Referring to FIG. 1, a computer graphics system upon which the present invention may be practiced is shown as 100. System 100 can include any computer controlled graphics systems for generating complex or three-dimensional images. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Data storage device 107 is coupled to bus 101 for storing information and instructions. Furthermore, an I/O device 108 is used for couple the computer system 100 onto a network.

Computer system 100 can also be coupled via bus 101 to an alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Also coupled to bus 101 is a graphics subsystem 111. Processor 102 provides the graphics subsystem 111 with graphics data such as drawing commands, coordinate vertex data, and other data related to an object's geometric position, color, and surface parameters. The object data is processed by graphics subsystem 111 in the following four pipelined stages: geometry subsystem, scan conversion subsystem, raster subsystem, and a display subsystem. The geometry subsystem converts the graphical data from processor 102 into a screen coordinate system. The scan conversion subsystem then generates pixel data based on the primitives (e.g., points, lines, polygons, and meshes) from the geometry subsystem. The pixel data is sent to the raster subsystem, whereupon z-buffering, blending, texturing, and anti-aliasing functions are performed. The resulting pixel values are stored in a frame buffer. The display subsystem reads the frame buffer and displays the image on display monitor 121.

The present invention uses textured silhouettes having minimal polygonal content in substitution of a three-dimensional models that have greater numbers of polygons. Since the silhouettes have less polygons, they can be rendered much faster. Johnson's criteria states that moving models should be brought into a scene as far away as possible. Hence, a moving object should be displayed in the scene as soon as possible (e.g., as soon as they contribute towards sub-pixels). In the currently preferred embodiment, the silhouette is derived from a snapshot of a three-dimensional model. In alternative embodiments, the silhouettes may be independently created by the data base modeller and stored directly into the texture memory. Since the silhouette is textured, it can have as much or greater detail than that of a conventional three-dimensional model. Furthermore, because silhouettes have less polygons, they are capable of being rendered with far less processing power as compared to that of traditional three-dimensional models.

FIG. 2A shows a three-dimensional model of an airplane 201 in a high level of detail. The model of airplane 201 is comprised of approximately one hundred polygons. For example, individual polygons are used to portray the cockpit 202, windows 203, engines 204, etc. FIG. 2B shows a three-dimensional model of the same airplane 201 in a medium level of detail. This model is coarser and can be rendered by approximately 50 polygons. Note that several of the features, such as the windows, have been eliminated from display. FIG. 2C shows a low level of detail for depicting airplane 201. This low level of detail can be represented with just 10 polygons. Airplane 201 is moved from one location to another location on a computer screen by calculating new coordinates for each of the vertices that define the polygons. Similarly, airplane 201 can be rotated in any number of views by manipulating the polygonal vertices (e.g., flying with the nose up, banking, diving, flying towards/away from the viewer, looking up/down at the airplane, etc.).

FIGS. 3A–C show silhouettes of airplane 201. Each of these silhouettes are comprised of just a single polygon that has several polygons. But since these silhouettes are flat (i.e., two-dimensional), several separate silhouettes are taken of the airplane from different fields of view (e.g., top view, bottom view, tail view, side views, etc.). For example, FIG. 3A shows a top view 301; FIG. 3B shows a side view 302; and FIG. 3C shows a front view 303. As described above, these silhouettes can be made from snapshots taken from actual three-dimensional models rotated at different angles. Alternatively, these silhouettes can be independently fabricated by drawing them directly into the texture map. In an alternative embodiment, a new silhouette can be interpolated from two known silhouettes. A new silhouette can also be taken from an interpolated model that was derived from two known model rotations. In both cases, the new silhouette can be generated either through hardware or software means.

The combination of these silhouettes gives an omni-directional view of the airplane. The number of different silhouettes used is variable. It depends on the accuracy that is desired; the more accurately one wishes to portray the movement of the airplane, the more silhouettes that are required. When airplane 201 is moving across a computer screen, the silhouette corresponding to the appropriate current field of view is selected for display. The vertices corresponding to the chosen silhouette can be altered so that the silhouette faces the viewer to track shifts in the viewpoint according to the airplane's fight plan. When the viewpoint changes to such a degree that it is not easily representable by the current silhouette, a different silhouette corresponding to the new viewpoint is chosen. FIGS. 4A–C show three different silhouettes 401–403 that can be used to display the sequence of motion as the airplane is descend and banking towards the viewer.

The silhouettes of the present invention are stored in one big texture map. For example, the different views of airplane 201 can be stored as a composite texture, as shown in FIG. 5. When a particular silhoutte is requested for display, it is retrieved by addressing that portion of the texture memory upon which that silhouette is being stored. One simply needs to switch from one portion of the texture memory to another in order to access a different silhouette. This type of silhouette access is both fast and inexpensive in terms of overhead. Hence, more objects can be drawn within a given amount of display time.

The currently preferred embodiment of the present invention uses a mixture of three-dimensional models as well as silhouettes. Initially, a moving object is rendered in a silhouette form. The silhouette corresponding to the closest actual representation is displayed in the scene. This silhouette display is maintained in the scene as long as possible until it reaches a certain tolerance level of threshold. At which point, the object is displayed in a conventional three-dimensional model representation. For instance, if the object moves too far off axis or moves too dose to the viewer, the display of that object switches from a silhouette form to that of a conventional three-dimensional model. An added advantage of the present invention is that a coarser silhouette can be fashioned from a medium level of detail model. Since the coarse silhouette is derived from the medium model, there are no anomalies that occur between transitions from one level of detail to the next.

In one embodiment, the present invention makes decisions for displaying either silhouettes or three-dimensional models based upon the load conditons. If enough process resources are available, the computer favors three-dimensional models over silhouttes. However, the introduction of numerous moving objects might cause the computer to select silhouettes over three-dimensional models. For example, a convoy of 10 moving trucks in a real-time simulation might require 200 polygons if each truck were to be modeled by 20 polygons. In contrast, if single polygon silhouettes were to be used instead, this would result in savings of up to 190 polygons (i.e., 19 polygons per truck). The actual savings might be less due to backface removal. This extra polygonal savings could potentially mean the difference between having real-time capabilities or not.

FIG. 6 is a flowchart describing the steps for displaying textured silhouettes in a computer graphics system. Initially, when a new object is created, a determination is made as to whether that object is significantly large enough to be displayed or has moved into the field of view. If the object is at such a distance that it contributes towards sub-pixels, then it is rendered for display as a silhouette, step 601. Otherwise, the object is moved without being displayed, step 613. Once it has been determined that the object is big enough to be displayed, various silhouettes corresponding to that particular object are created, step 602. These silhouettes are stored in the texture map, step 603. Next, the appropriate silhouette is selected for display by accessing the addresses of the texture memory upon which that particular silhouette is stored, step 604. The silhouette is rotated to track the user's viewpoint so that the silhouette is maintained in a frontal view as much as possible, step 605. Thereupon, the silhouette is rendered for display in that frame, step 606.

The next frame is rendered for display one frame time later, step 607. When the object is rendered in the next frame, new vertices are calculated, scan conversion is performed, hidden surfaces are removed, etc. A determination is made in step 608 as to whether the object should be transitioned into an actual three-dimensional model. This determination is based on a variety of factors, such as its distance to the viewer, its angle of rotation, etc. If it is appropriate to display a three-dimensional model in place of the silhouette, a determination is made as to whether there is enough resources to display the model, step 609. Otherwise, the silhouette is maintained, and step 612 is performed. If there are enough computing resources available, then the model is displayed, step 611. An optional step might be to transition back to a silhouette whenever the system wishes to transfer the computing resources towards the display of other new objects. If, however, there are not enough computing resources, the object is maintained in its silhouette format, step 610. In step 612, a determination is made as to whether a new silhouette is to be displayed. A new silhouette might be necessitated when the user's field of view transitions beyond that offered by the current silhouette. If a new silhouette is required, then step 604 is executed. Otherwise, the process executes step 605.

FIG. 7 is a flowchart describing the steps for generating silhouettes. Initially, a traditional three-dimensional model is generated for the object to be displayed, step 701. Different levels are generated for the three-dimensional model. A snapshot is taken based upon the three-dimensional model, step 702. In step 703, the snapshot is turned into a single polygon or low-number of polygons billboard. The three-dimensional model is then rotated to give a different angle of view, step 705. Steps 701–703 and 705 are repeated until substantially all angles of view from which the object can be viewed in a three-dimensional volume are depicted in silhouette forms. Optionally, intermediate silhouettes can be generated by interpolating from adjacent silhouettes. Once step 704 determines that the object has been covered omnidirectionally by the silhouettes, the process is repeated for each of the different levels of detail, such that each level of detail has its own corresponding set of silhouettes. The silhouettes corresponding to a particular level of detail is stored in texture memory as a composite texture map.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a computer system, a method of displaying an object, comprising the steps of:

generating a two-dimensional silhouette representation of the object;

generaing a three-dimensional model of the object comprised of a plurality of polygons;

storing the silhouette representation in texture memory;

determining whether a threshold has been met, wherein if the threshold is met;

reading the silhouette representation from the texture memory;

displaying the silhouette representation;

and if the threshold is not exceeded;

rendering the three-dimensional model for display.

2. The method of claim 1 further comprising the step of generating a plurality of silhouettes, wherein the silhouettes correspond to different levels of detail.

3. The method of claim 2 further comprising the step of displaying one of the silhouettes in substitution of a three-dimensional model, wherein the silhouette has less polygons that the three-dimensional model.

4. The method of claim 1 further comprising the step of interpolating a new silhouette from two adjacent silhouettes.

5. The method of claim 1, wherein the silhouettes are generated by taking snapshots of a three-dimensional model in different angles of view.

6. The method of claim 1, wherein the threshold corresponds to an axis of rotation.

7. The method of claim 1, wherein the threshold corresponds to a distance of the object from the viewer.

8. The method of claim 1, wherein a coarse silhouette is generated based upon a model at a higher level of detail.

9. An apparatus for displaying an object on a display screen, comprising:

a processor for generating a three-dimensional model of the object comprised of a plurality of polygons and for generating a plurality of silhouette representations of the object, wherein the silhouette representations depict the object when viewed at from different angles;

a texture memory coupled to the processor for storing the silhouette representations;

an interface coupled to the texture memory for accessing a first silhouette when the object is displayed in one frame at a first field of view and for accessing a second silhouette when the object is moved and displayed in a second frame at a second field of view;

a threshold detector for detecting when a threshold has been met, wherein if the threshold is met, the three-dimensional model of the object is displayed instead of the silhouette representation.

10. The apparatus of claim 9, wherein the processor generates three-dimensional models corresponding to a plurality of levels of detail and a set of silhouettes are generated corresponding to each level of detail.

11. The apparatus of claim 9 further comprising logic coupled to the processor for interpolating a new silhouette from two adjacent silhouettes.

12. A method of displaying an object in a real-time simulation, comprising the steps of:

generating a plurality of silhouettes of the object, wherein the silhouettes represent the object when viewed from different angles;

storing the plurality of silhouettes in a texture map;

specifying which one of the silhouettes correspond to the angle of view that is to be displayed;

retrieving the specified silhouette from memory;

displaying the specified silhouette;

repeating the specifying, retrieving, and displaying steps for a different silhouette when a field of view corresponding to the object changes;

generating a three-dimensional polygon representation of the object;

determining whether to display the object by either the three-dimensional representation or the silhouette, wherein if the silhouette is selected for display.

13. The method of claim 12, wherein the silhouettes are generated comprising the steps of:

modeling a three-dimensional model as a plurality of polygons;

taking a first snapshot of the object, wherein a first silhouette is comprised of the first snapshot having less polygons than the model;

rotating the object;

taking a second snapshot after the object is rotated, wherein a second silhouette is comprised of the second snapshot having less polygons than the model.

14. The method of claim 13 further comprising the step of displaying one of the silhouettes and subsequently substituting the silhouette with the three-dimensional model for display.

15. The method of claim 12 further comprising the steps of:

generating a plurality of models for a plurality of levels of detail corresponding to the object;

storing the plurality of models in memory;

generating a plurality of sets of silhouettes corresponding to the plurality of models at different levels of detail;

selecting one of the silhouettes for display according to a level of detail.

16. The method of claim 12 further comprising the step of deriving a new silhouette from two nearby silhouettes.

17. The method of claim 12, wherein a coarse silhouette is generated based on a model corresponding to a higher level of detail.

* * * * *